US012153969B1

(12) United States Patent
Liang et al.

(10) Patent No.: US 12,153,969 B1
(45) Date of Patent: Nov. 26, 2024

(54) SHELF LABEL COMMUNICATION METHOD BASED ON SYNCHRONOUS NETWORK, SHELF LABEL SYSTEM AND COMPUTER DEVICE

(71) Applicant: HANSHOW TECHNOLOGY CO., LTD., Jiaxing (CN)

(72) Inventors: Min Liang, Jiaxing (CN); Yaping Ji, Jiaxing (CN); Yujing Wang, Jiaxing (CN); Longfei Gao, Jiaxing (CN); Qi Jiang, Jiaxing (CN); Ju Zhang, Jiaxing (CN); Gengfeng Chen, Jiaxing (CN); Guofeng Zhang, Jiaxing (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/656,174

(22) Filed: May 6, 2024

(30) Foreign Application Priority Data

Jun. 6, 2023 (CN) .......................... 202310666787.4

(51) Int. Cl.
*G06F 9/46* (2006.01)
*G06F 9/52* (2006.01)
*G09F 3/20* (2006.01)

(52) U.S. Cl.
CPC ................ *G06F 9/52* (2013.01); *G09F 3/208* (2013.01)

(58) Field of Classification Search
CPC .................................. G06F 9/52; G09F 3/208
See application file for complete search history.

(56) References Cited

U.S. PATENT DOCUMENTS

| 2011/0234375 A1 | 9/2011 | Kono et al. |
| 2012/0161932 A1 | 6/2012 | Byun et al. |
| 2012/0161943 A1 | 6/2012 | Byun et al. |
| 2019/0327642 A1 | 10/2019 | Peng et al. |

FOREIGN PATENT DOCUMENTS

| CN | 108255434 A | 7/2018 |
| CN | 108694421 A | 10/2018 |
| CN | 110310174 A | 10/2019 |
| CN | 112633434 A | 4/2021 |
| CN | 112822763 A | 5/2021 |

(Continued)

OTHER PUBLICATIONS

First CNOA issued in Application No. 202310666787.4 dated Jul. 28, 2023 with English translation, (10p).

(Continued)

*Primary Examiner* — Gregory A Kessler
(74) *Attorney, Agent, or Firm* — Arch & Lake LLP; Zhangyuan Ji

(57) ABSTRACT

The disclosure provides a shelf label communication method based on a synchronous network, a shelf label system and a computer device. In the method, an electronic shelf label establishes a first timing task of a timer when receiving a timing service instruction; determines a timing duration of the first timing task based on a time difference between current local system time when the timing service instruction is received and the instruction execution system time, and starts the first timing task; the electronic shelf label cyclically calibrates a current timing duration in the first timing task based on the periodically received base-station system time, to obtain the calibrated current timing duration.

20 Claims, 5 Drawing Sheets

(56) References Cited

FOREIGN PATENT DOCUMENTS

| | | |
|---|---|---|
| CN | 114554399 A | 5/2022 |
| CN | 114666878 A | 6/2022 |
| CN | 114970788 A | 8/2022 |
| CN | 115002902 A | 9/2022 |
| CN | 115760167 A | 3/2023 |
| CN | 116048441 A | 5/2023 |
| CN | 116208563 A | 6/2023 |
| KR | 20100041969 A | 4/2010 |
| WO | 2017013690 A1 | 1/2017 |
| WO | 2021077321 A1 | 4/2021 |

OTHER PUBLICATIONS

Notification to Grant Patent Right for Invention issued in Application No. 202310666787.4 dated Aug. 18, 2023 with English translation, (3p).
Search Report issued in Application No. 202310666787.4 dated Jul. 28, 2023, (3p).
JP NOA issued in Application No. 2024-089983 dated Sep. 3, 2024, (3p).

SHELF LABEL COMMUNICATION METHOD BASED ON SYNCHRONOUS NETWORK, SHELF LABEL SYSTEM AND COMPUTER DEVICE

CROSS-REFERENCE TO RELATED APPLICATIONS

This application is based upon and claims priority to Chinese Patent Application No. 202310666787.4, filed on Jun. 6, 2023, the entire disclosure of which is incorporated herein by reference for all purposes.

TECHNICAL FIELD

The disclosure relates to the technical field of wireless communication, in particular to a shelf label communication method based on a synchronous network, a shelf label system and a computer device.

BACKGROUND

With electronic shelf label systems are more and more widely used in various fields, the requirement for service speed is also higher and higher, for example, store managers expect of a batch of shelf labels in the store to quickly execute an instruction at specified time. In the existing electronic shelf label system, the duration for issuing service instructions to a batch of shelf labels in a store at specified time varies depending on different numbers of shelf labels, and the duration for issuing service instructions for large batches of shelf labels may take tens of minutes or even hours, so the shelf labels may also take longer time to execute service instructions in succession.

It can be seen that in the electronic shelf label communication method in the prior art, as it takes a long time for the service instructions to be sent to the batch of shelf labels, the response time of the batch of shelf labels to the service instructions is long. As a result, the users' requirements for the batch of shelf labels to quickly execute the service in the specified time cannot be met.

SUMMARY

In a first aspect, the disclosure provides a shelf label communication method based on a synchronous network, the method including: establishing, by an electronic shelf label, a first timing task of a timer in response to receiving a timing service instruction sent in advance by a server through a base station in a synchronous network; and the timing service instruction including an ID identifier of at least one electronic shelf label, a service instruction type, a configuration parameter and an instruction execution system time; determining, by the electronic shelf label, a timing duration of the first timing task based on a time difference between a first current local system time when the timing service instruction is received and the instruction execution system time, and starting, by the electronic shelf label, the first timing task; cyclically calibrating, by the electronic shelf label and in response to periodically receiving a synchronization signal including base-station system time that is sent by the base station, a second current local system time when the synchronization signal is received and a current timing duration in the first timing task based on the base-station system time, to obtain a calibrated current timing duration; and executing, by the electronic shelf label, the timing service instruction based on the service instruction type and the configuration parameter, in response to determining that the current timekeeping duration of the first timing task is equal to the calibrated current timing duration.

In a second aspect, the disclosure provides a shelf label system, includes a server, a plurality of base stations and a plurality of electronic shelf labels. The server is configured to send a timing service instruction prior to an instruction execution system time; and the timing service instruction includes an ID identifier of at least one electronic shelf label, a service instruction type, a configuration parameter and the instruction execution system time. The base station is configured to send the received timing service instruction to the electronic shelf label, is also configured to receive the synchronization signal with the base-station system time sent by the superior base station to calibrate the local system time, and is also configured to periodically send the calibrated local system time as the base-station system time of the current base station to at least one of a subordinate secondary base station or the electronic shelf label. The electronic shelf label is configured to establish a first timing task of a timer in response to receiving the timing service instruction, and is also configured to determine a timing duration of the first timing task based on time difference between a first current local system time when the timing service instruction is received and the instruction execution system time, and to start the first timing task, and is also configured to cyclically calibrate a second current local system time when the synchronization signal is received and current timing duration in the first timing task based on the base-station system time, to obtain the calibrated current timing duration; and is also configured to execute the timing service instruction based on the service instruction type and the configuration parameter in response to determining that the current timekeeping duration of the first timing task is equal to the calibrated current timing duration.

In a third aspect, the disclosure provides a computer device including a memory, a processor and a computer program stored on the memory and executable on the processor, and when executing the computer program, the processor implements the following steps: an electronic shelf label establishes a first timing task of a timer in response to receiving a timing service instruction sent in advance by a server through a base station in a synchronous network; and the timing service instruction includes an ID identifier of at least one electronic shelf label, a service instruction type, a configuration parameter and instruction execution system time; the electronic shelf label determines a timing duration of the first timing task based on time difference between a first current local system time when the timing service instruction is received and the instruction execution system time, and starts the first timing task; in response to periodically receiving a synchronization signal including base-station system time that is sent by the base station, the electronic shelf label cyclically calibrates a second current local system time when receiving the synchronization signal and current timing duration in the first timing task based on the base-station system time, to obtain the calibrated current timing duration; and in response to determining that the current timekeeping duration of the first timing task is equal to the calibrated current timing duration, the electronic shelf label executes the timing service instruction based on the service instruction type and the configuration parameter.

DETAILED DESCRIPTION

Figure 1:
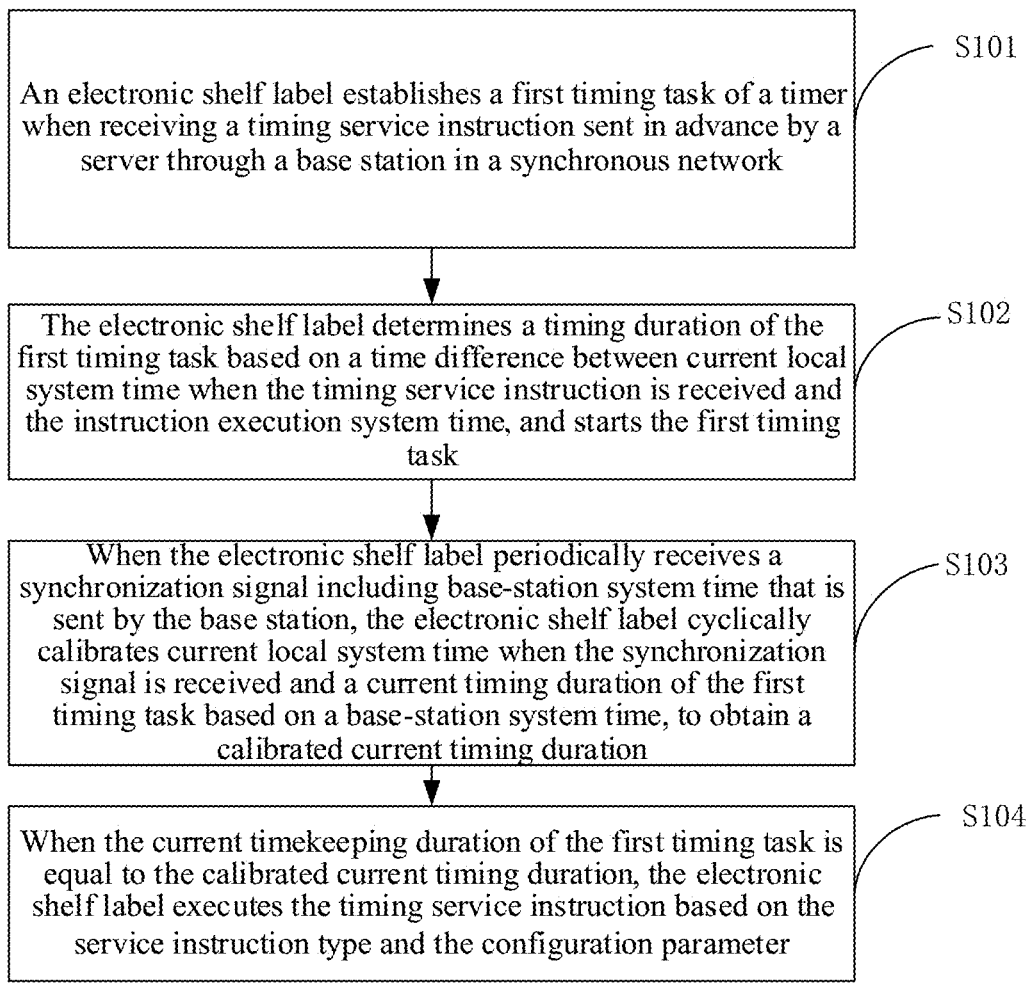
FIG. 1 illustrates a flowchart diagram of a shelf label communication method based on a synchronous network according to an embodiment of the present disclosure.

In order that the objectives, technical solutions and advantages of the embodiments of the present disclosure are clearer, the technical solutions in the embodiments of the present disclosure will be illustrated clearly and completely below with reference to the drawings for the embodiments of the present disclosure. Obviously, those described are a part, rather than all, of the embodiments of the present disclosure. Based on the embodiments in the present disclosure, any other embodiment obtained by those of ordinary skill in the art without creative work are within the protection scope of the present disclosure.

Aiming at the disadvantages of the prior art, the present disclosure provides a shelf label communication method based on a synchronous network, a shelf label system and a computer device, which solve the problem in the prior art that the response time of the batch of electronic shelf labels to the service instructions is long, and in which by sending timing service instructions to the batch of electronic shelf labels in advance and periodically and cyclically calibrating the local system time of the electronic shelf labels, so that the batch of electronic shelf labels can execute corresponding services almost simultaneously at the time specified by the server, thereby meeting the users' requirements for the batch of shelf labels to quickly execute the service in the specified time.

Compared with the prior art, the present disclosure has the following advantageous effects:

In the present disclosure, the electronic shelf label determines a timing duration of the timing task based on the execution system time in the timing service instruction when receiving the timing service instruction sent by the server in advance; then, cyclically calibrates the timing duration based on the periodically received base-station system time, to obtain an accurate timing duration; and finally determines the system time reaching the instruction execution time and executes the corresponding service instruction when the current timekeeping duration of the timing task is equal to the current timing duration. Therefore, in the present disclosure, by sending timing service instructions to the batch of electronic shelf labels in advance and periodically and cyclically calibrating the local system time of the electronic shelf labels, the batch of electronic shelf labels can execute corresponding services almost simultaneously at the time specified by the server, the timing error between different shelf labels is only at ms level, achieving the execution effect of ms level precise timing service that cannot be distinguished by human eyes, greatly reducing the response time of a batch of shelf labels in the store to the service instruction, thereby meeting the users' requirements for the batch of shelf labels to quickly execute the service in the specified time.

In a first aspect, the present disclosure provides a shelf label communication method based on a synchronous network, which specifically includes the following embodiments.

FIG. 1 illustrates a flowchart diagram of a shelf label communication method based on a synchronous network according to an embodiment of the present disclosure. As shown in FIG. 1, the shelf label communication method based on a synchronous network is applied to a shelf label system, and the shelf label system includes a server, a base station and an electronic shelf label, specifically includes the following steps:

Step S101, an electronic shelf label establishes a first timing task of a timer when receiving a timing service instruction sent in advance by a server through a base station in a synchronous network.

Figure 2:
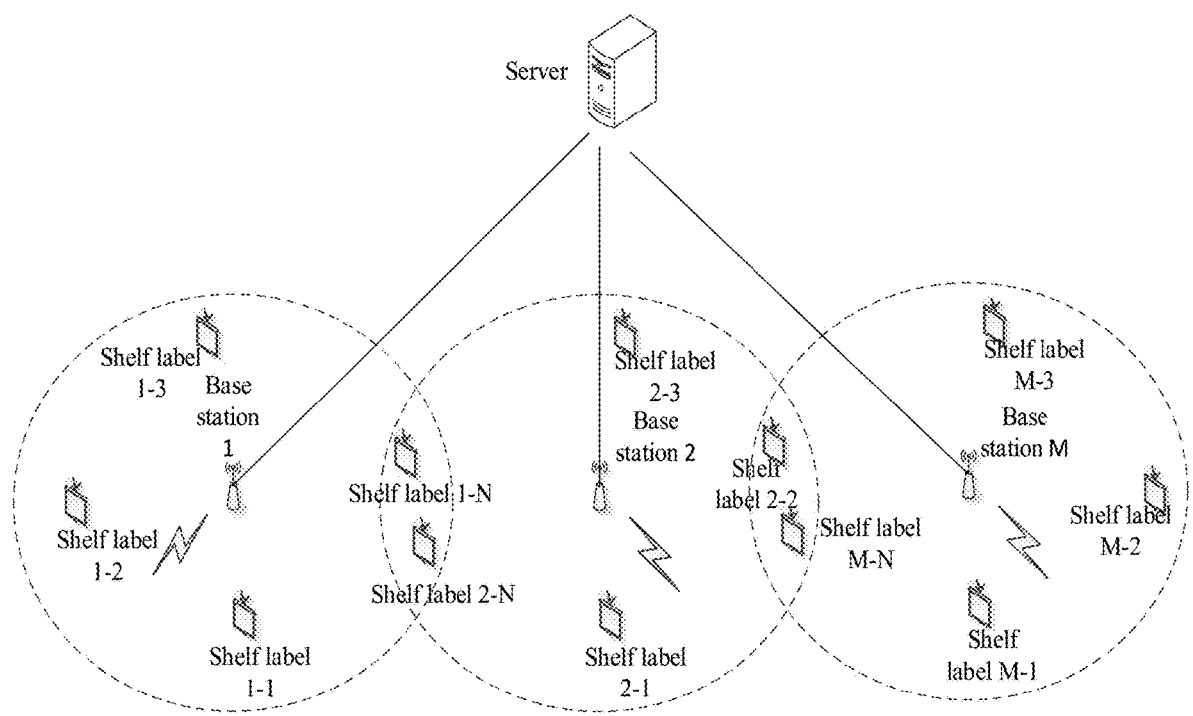
FIG. 2 illustrates a structural diagram of a shelf label system according to an embodiment of the present disclosure.

It should be noted that, as shown in FIG. 2, in this embodiment, the shelf label system of each store includes a server, a plurality of base stations and several electronic shelf labels. The server sends a synchronization signal to the electronic shelf label through the base station.

Figure 3:
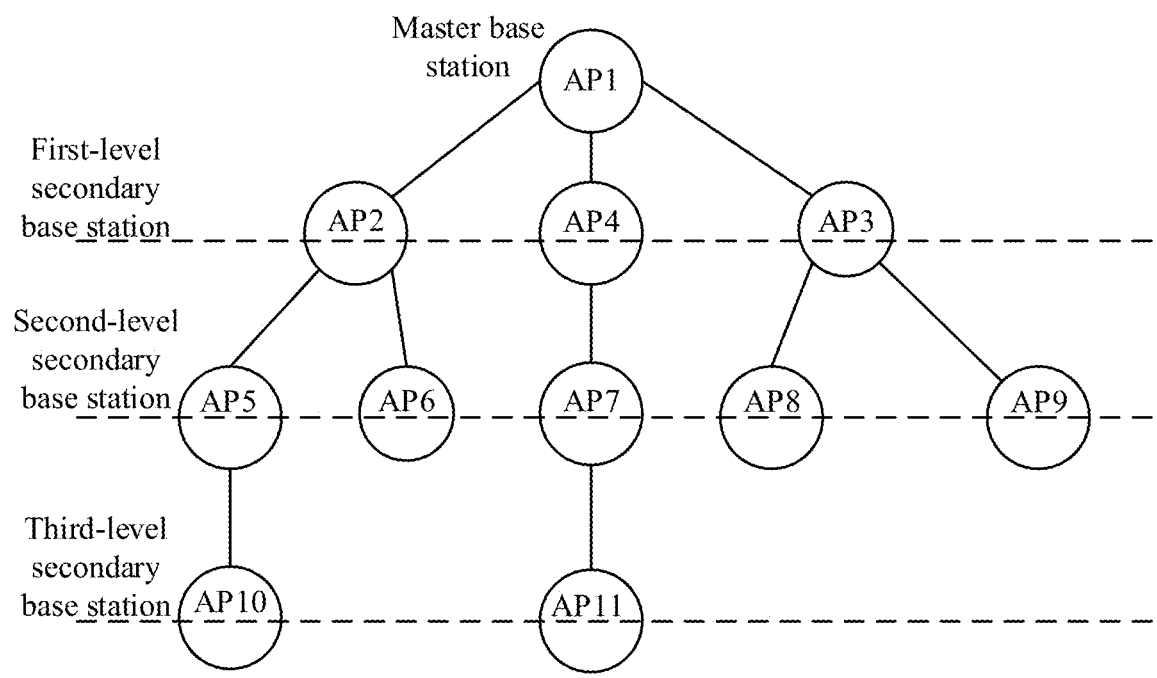
FIG. 3 illustrates a schematic diagram of a base station topological structure according to an embodiment of the present disclosure.

In this embodiment, the base station in the synchronous network has the base station topological structure as shown in FIG. 3, which includes a master base station, a first-level secondary base station directly connected to the master base station, and a $(i+1)^{th}$-level secondary base station directly connected to an $i^{th}$-level secondary base station; where i is a positive integer greater than or equal to 1, and each base station is connected to only one superior base station. AP1 in FIG. 3 denotes the base station 1 and AP2 denotes the base station 2, and AP11 denotes the base station 11. The base station topological structure may be established in such a way that the server controls all base stations in the store to send distance measurement signals in sequence, and obtains distance measurement results between each base station and other base stations based on the strength of feedback signals sent from other base stations received by each base station; and the server then establishes the base station topological structure based on the distance measurement results between all base stations.

In this embodiment, an interface for setting a timing service instruction is provided on the server, specifically including an instruction type, system time of instruction timing execution, and a batch of shelf label lists of the instruction execution, that is, the timing service instruction includes an ID identifier of at least one electronic shelf label, a service instruction type, a configuration parameter and an instruction execution system time; the server forwards the timing service instruction through the base station in the synchronous network in advance, so that all the electronic shelf labels of which identifier is involved in the timing service instruction can receive the timing service instruction. In addition, in this embodiment, the electronic shelf label establishes the first timing task for the timer in the electronic shelf label when receiving the timing service instruction. Since the timing service instruction is sent to the electronic shelf label in advance by the server, does not need to be executed by the electronic shelf label immediately, and is executed at the specified instruction execution system time in the timing service instruction, so in order to make the electronic shelf label execute the instruction in time at the specified system time, reminding is made through the first timing task of the timer.

It can be seen that in this embodiment, the server does not need to wait until the system time executing the instruction before issuing the instruction, and instead, issues the data or parameters required for executing the instruction to the specified batch of shelf labels in advance within one protection time before the instruction execution time, so that the batch of electronic shelf labels store the timing service instruction the local area and executes the timing service instruction at the specified time.

Step S102, the electronic shelf label determines a timing duration of the first timing task based on a time difference between current local system time when the timing service instruction is received and the instruction execution system time, and starts the first timing task.

In the embodiment, the timing duration of the first timing task is a time difference between the current local system time when the electronic shelf label receives the timing service instruction and the instruction execution system time in the timing service instruction. The first timing task may be started after the timing duration of the first timing task is determined.

Step S103, when the electronic shelf label periodically receives a synchronization signal including base-station system time that is sent by the base station, the electronic shelf label cyclically calibrates current local system time when the synchronization signal is received and a current timing duration of the first timing task based on a base-station system time, to obtain a calibrated current timing duration.

It should be noted that in order to maintain the system synchronization of the synchronous network, the server may periodically send synchronization signals through the master base station to the respective secondary base station and each electronic shelf label, so that the respective secondary base station and the electronic shelf label make a calibration based on parameters such as the base station system time, frequency and transmission time slot in the synchronous signal. In this embodiment, the synchronization signal including the base station system time is regarded as a target synchronization signal, and the synchronization signal not including the base station system time is regarded as a normal synchronization signal.

In this embodiment, after the first timing task is started, when receiving the target synchronization signal including the base station system time, the electronic shelf label calibrates the current local system time when the target synchronization signal is received based on the base station system time, so that the current local system time is consistent with the local system time of the base station sending the target synchronization signal, and the electronic shelf label also calibrates the current timing duration in the first timing task based on the calibrated current local system time, to obtain a calibrated current timing duration. It should be noted that during the timing duration of the first timing task, there may be many times of cyclic calibration, and the current timing duration after each calibration is regarded as the current timing duration of the first timing task in the next calibration. The base station system time includes a calibrated local system time of the master base station or a calibrated local system time of the $i^{th}$-level secondary base station.

It can be seen that in this embodiment, the server system time obtained by each base station is not obtained separately from the server, but by using the synchronous network between the base stations, the system time expands along with the synchronization signal from the master base station to the first-level secondary base station, and then to the second-level secondary base station, and gradually expands to all the base stations in the store. The system time of all base stations is the same origin, and the local system time is constantly calibrated through synchronization, and the wireless transmission error between base stations is only at us level, far less than the transmission delay of the wired network. In addition, the shelf label keeps synchronization with the base station and periodically obtains the system time that is sent by the base station, periodically calibrates the local system time and local timekeeping, and calibrates the local timer. The timing error between different shelf labels is only at ms level, which may achieve the execution effect of ms level precise timing service that cannot be distinguished by human eyes.

Step S104, when the current timekeeping duration of the first timing task is equal to the calibrated current timing duration, the electronic shelf label executes the timing service instruction based on the service instruction type and the configuration parameter.

In this embodiment, the calibrated current timing duration is a fixed duration threshold in the first timing task. The current timekeeping duration is a duration that starts from zero and positively accumulates after the first timing task is started. Therefore, when the current timekeeping duration of the first timing task is equal to the calibrated current timing duration, that is, when the current local system time of the electronic shelf label is equal to the instruction execution system time in the timing service instruction, the electronic shelf label executes the timing service instruction, and the service instruction type includes but is not limited to a switching page instruction, a flashing instruction and an updating instruction, and the configuration parameter includes but is not limited to a switching page number, flashing light status, flashing light color and update content.

Compared with the prior art, the embodiment has the following advantageous effects:

In this embodiment, the electronic shelf label determines a timing duration of the timing task based on the execution system time in the timing service instruction when receiving the timing service instruction sent by the server in advance; then, cyclically calibrates the timing duration based on the periodically received base station system time, to obtain an accurate timing duration; and finally determines the system time reaching the instruction execution time and executes the corresponding service instruction when the current timekeeping duration of the timing task is equal to the current timing duration. Therefore, in this embodiment, by sending timing service instructions to the batch of electronic shelf labels in advance and periodically and cyclically calibrating the local system time of the electronic shelf labels, the batch of electronic shelf labels can execute corresponding services almost simultaneously at the time specified by the server, the timing error between different shelf labels is only at ms level, achieving the execution effect of ms level precise timing service that cannot be distinguished by human eyes, greatly reducing the response time of a batch of shelf labels in the store to the service instruction, thereby meeting the users' requirements for the batch of shelf labels to quickly execute the service in the specified time.

Figure 4:
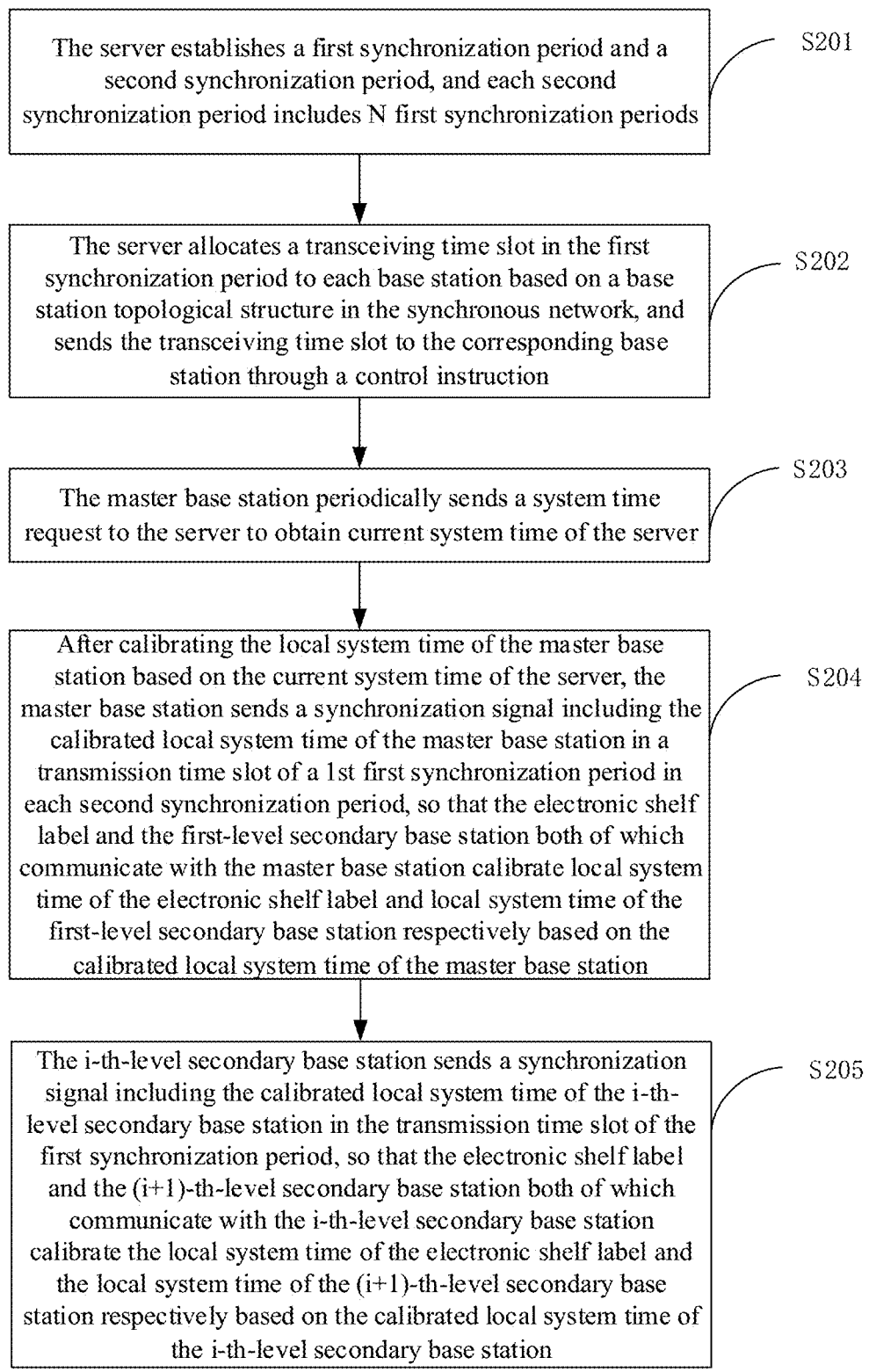
FIG. 4 illustrates a schematic diagram of calibrating system time in a synchronous network according to an embodiment of the present disclosure.

FIG. 4 illustrates a schematic diagram of calibrating system time in a synchronous network according to an embodiment of the present disclosure. As shown in FIG. 4, system time calibration in the synchronous network specifically includes the following steps:

Step S201, the server establishes a first synchronization period and a second synchronization period, and each second synchronization period includes N first synchronization periods;

Step S202, the server allocates a transceiving time slot in the first synchronization period to each base station based on a base station topological structure in the synchronous network, and sends the transceiving time slot to the corresponding base station through a control instruction;

Step S203, the master base station periodically sends a system time request to the server to obtain current system time of the server;

Step S204, after calibrating the local system time of the master base station based on the current system time of the server, the master base station sends a synchronization signal including the calibrated local system time of the master base station in a transmission time slot of a 1st first synchronization period in each second synchronization period, so that the electronic shelf label and the first-level secondary base station both of which communicate with the master base station calibrate local system time of the electronic shelf label and local system time of the first-level secondary base station respectively based on the calibrated local system time of the master base station;

Step S205, the $i^{th}$-level secondary base station sends a synchronization signal including the calibrated local system time of the $i^{th}$-level secondary base station in the transmission time slot of the first synchronization period, so that the electronic shelf label and the $(i+1)^{th}$-level secondary base station both of which communicate with the $i^{th}$-level secondary base station calibrate the local system time of the electronic shelf label and the local system time of the $(i+1)^{th}$-level secondary base station respectively based on the calibrated local system time of the $i^{th}$-level secondary base station.

In this embodiment, at the first establishment of the synchronous network, the method further includes: the server sends a synchronization signal including initial system time of the server to the master base station in the synchronous network, so that the master base station starts to operate according to the initial system time of the server; the master base station sends a synchronization signal including master base station system time in a transmission time slot of the first synchronization period, so that the electronic shelf label and the first-level secondary base station both of which communicate with the master base station start to operate according to the master base station system time; and the $i^{th}$-level secondary base station sends a synchronization signal including the local system time of the $i^{th}$-level secondary base station in the transmission time slot of the first synchronization period, so that the electronic shelf label and the $(i+1)^{th}$-level secondary base station respectively both of which communicate with the $i^{th}$-level secondary base station start to operate according to the local system time of the $i^{th}$-level secondary base station.

Figure 5:
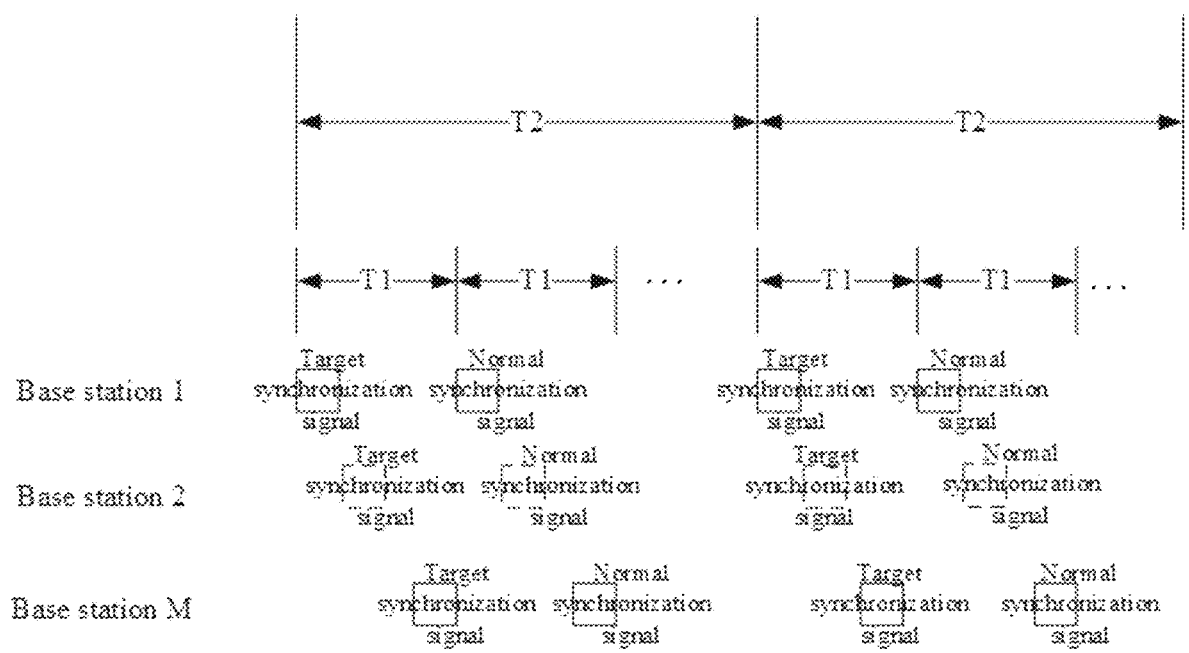
FIG. 5 illustrates a timing diagram of a base station sending a target synchronization signal according to an embodiment of the present disclosure.

It should be noted that, as shown in FIG. 5, this embodiment includes a first synchronization period T1 and a second synchronization period T2, and each second synchronization period includes N first synchronization periods. In each first synchronization period, the server allocates a transceiving time slot to each base station based on the base station topological structure. As shown in FIG. 5, in the first synchronization period, the base station 1 performs transmission first, followed by the base station 2, and then by analogy to the base station M. The specific allocation principle of the transceiving time slots may be the master base station first, then the first-level secondary base station, the second-level secondary base station to the last-level secondary base station, or may be that adjacent base stations have adjacent time slots.

In this embodiment, the synchronization signal in the 1st T1 period of each T2 period carries base-station system time, and the synchronization signal in other T1 periods of the T2 period does not carry the base-station system time, which is equivalent to that all the base stations and electronic shelf labels in the synchronous network perform time calibration according to the T2 period. It should be emphasized that the base-station system time in the synchronization signal sent by each base station is different. Each base station calibrates the local system time of the base station based on the system time of the base station in the received synchronization signal, and obtains the current calibrated local system time. Then the base station does not send the synchronization signal to other base stations or electronic shelf labels immediately after calibrating the local system time, and sends the synchronization signal in the 1st T1 period of each T2 period and at the time point of the current base station transmission time slot in the 1st T1 period, then after the local system time is calibrated based on the received base-station system time, until the time period when the current base station sends the synchronization signal, there will be a delay time difference, so that the base-station system time sent by the current base station should be the current calibrated local system time plus the delay time difference.

It should be noted that at the time of the first communication in the synchronous network, all electronic shelf labels and all base stations do not have local system time. The master base station receives the initial system time of the server as the local system time to starts to operate, and sends the synchronization signal carrying the system time of the master base station to the electronic shelf label and the first-level secondary base station, so that the electronic shelf label and the first-level secondary base station both of which communicate with the master base station start to operate according to the system time of the master base station, and the system time of the master base station is the local system time when the master base station sends the synchronization signal, and so on, other secondary base stations and electronic shelf labels also start operating according to the local system time sent by the superior secondary base station.

In addition, all electronic shelf labels and all base stations have their own local system time after the normal communication in the synchronous network. Then it is necessary to calibrate the local system time based on the base-station system time in the received target synchronization signal. The principle of calibration is to compare the local system time with the base-station system time, and no update is made if the two times are the same, and the base-station system time in the synchronization signal is used as the local system time if the two times are different.

Compared with the prior art, the embodiment has the following advantageous effects:

In the existing electronic shelf label system communication method, a plurality of base stations in the same store respectively obtain the system time from the back-end server, and it is difficult to meet the error requirements of ms level between the base stations. The shelf label of the shelf label system can obtain the system time only through the base station, and the local timekeeping of the shelf label may also have accumulative error, therefore, the system time error of timekeeping between the shelf labels is actually larger than the error between the base stations, which cannot meet the need of accurate timing service that the store-wide shelf labels have a uniform system time accurate to ms level error. In the present application, the system time of the base station is not obtained separately from the back-end server, but by using the synchronous network between the base stations, the system time expands along with the synchronization signal from the master base station to the first-level secondary base station, and then to the second-level secondary base station, and gradually expands to all the base stations in the store. The system time of all base stations is the same origin, and the local system time is constantly calibrated through synchronization, and the wireless transmission error between base stations is only at us level, far less than the transmission delay of the wired network. In addition, the shelf label keeps synchronization with the base station and periodically obtains the system time that is sent by the base station, periodically calibrates the local system time and local timing, and calibrates the timer for the timing service issued by the back-end system. The timing error between different shelf labels is only at ms level, which may achieve the execution effect of ms level precise timing service that cannot be distinguished by human eyes.

In another embodiment of the disclosure, when the timing service instruction further includes service execution duration, after the electronic shelf label executes the timing service instruction based on the service instruction type and the configuration parameter, the method further includes: the electronic shelf label establishes a second timing task of a timer, and determines the service execution duration as a timing duration of the second timing task; and when current timekeeping duration of the second timing task is equal to the service execution duration, the electronic shelf label executes a latest historical service instruction prior to the timing service instruction.

It should be noted that when the execution content or update content of the timing service instruction is only in a temporary execution state, the execution duration may be indicated when the timing service instruction is issued. When the execution duration expires, the display content of the electronic shelf label may change back to the display content of the original screen. For example, a store manager expects a specified batch of shelf labels to update the display content of the screen at the specified duration. For example, in a Seckill activity, it is necessary to quickly change to promotional information such as the price of goods displayed on the shelf label at the start time of the activity, the store manager can first send the update content to the shelf label to be pre-stored via the base station through the back-end server, and carry the system time and display holding time that need to update the screen display according to the update content in the timing instruction. When the shelf label is timed to the specified system time, the shelf label updates the screen display with the pre-stored update content according to the instruction, and a batch of shelf labels can quickly complete the update task. The shelf label continues to timekeeping according to the display holding time. After the display holding time expires, the shelf label controls to change the screen display content back to the original screen display content, and the Seckill activity ends.

In another embodiment of the disclosure, when receiving at least two timing service instructions sent in advance by a server through a base station in a synchronous network, the electronic shelf label determines whether the service instruction types of the at least two timing service instructions are the same; and if the service instruction types of the at least two timing service instructions are all different, or if the instruction types of the at least two timing service instructions are the same and the instruction execution system time does not overlap, the electronic shelf label establishes corresponding timing tasks for different timing service instructions.

It should be noted that the store manager can set one or more timing service instructions in one time through the back-end server, which can be for the same shelf label or for different shelf labels, and the service instruction type can be the same or different. The back-end server sends the timing instruction to the shelf label. The shelf label caches one or more timing service instructions, calculates the timeout time respectively and starts multiple timers at the same time. When the timeout time of one timer reaches, the corresponding instruction is triggered to be executed.

For example, the store manager plans to check inventory at a certain system time, and then plans to clean up the goods nearing its expiration date after the inventory is checked. Two timing service instructions may be set through the back-end server. The back-end server issues a timing switching page service to the shelf label of the inventory to be checked and specifies the system time and holding time for displaying inventory pages in the timing switching page service, then issues a timing light flashing service to the shelf label of the goods nearing its expiration date that needs to be cleaned, and the specified flashing time is time after the planned completion of inventory check, and the flashing color, flashing duration, flashing frequency and other parameters is specified. The shelf label stores the received two timing service instructions, sets the timeout time for two tasks and starts two timers based on the difference between the local time and the specified system time. When the timing switching page service time is up, the shelf label will switch the screen display to the specified inventory page according to the display page in the instruction, and continue the timekeeping according to the display holding time, and after the timeout, the shelf label controls to change the screen display content back to the original screen display content. Then the second timing light flashing service of the shelf label times out, the shelf label starts to flash based on the flashing parameter in the instruction, to remind the salesclerk to deal with the goods nearing its expiration date bound by the flashing shelf label. The shelf label continues to timekeeping according to the flashing duration, and the shelf label controls to turns off the light after the timeout, and all tasks end.

In another embodiment of the disclosure, the method further includes: if the at least two timing service instructions have two target timing service instructions which have the same service type and of which the instruction execution system time also effectively overlap, the electronic shelf label fuses the two target timing service instructions and then establishes a corresponding timing task.

In this embodiment, the effective overlap includes that the two target timing service instructions are in effect during the same time period. The electronic shelf label fuses the two target timing service instructions, including that when the timing service instruction with the later effective time is executed, the timing service instruction with the earlier effective time becomes invalid.

In a second aspect, the present disclosure provides a shelf label system, the shelf label system including a server, a plurality of base stations and a plurality of electronic shelf labels;

the server is configured to sends a timing service instruction prior to an instruction execution system time; and the timing service instruction includes an ID identifier of at least one electronic shelf label, a service instruction type, a configuration parameter and the instruction execution system time;

the base station is configured to send the received timing service instruction to the electronic shelf label, is also configured to receive the synchronization signal with the base-station system time sent by the superior base station to calibrate the local system time, and is also configured to periodically send the calibrated local system time as the base-station system time of the current base station to a subordinate secondary base station or/and the electronic shelf label;

the electronic shelf label is configured to establish a first timing task of a timer when receiving the timing service instruction, and is also configured to determine a timing duration of the first timing task based on a time difference between current local system time when the timing service instruction is received and the instruction execution system time, and to start the first timing task, and is also configured to cyclically calibrate current local system time when the synchronization signal is received and a current timing duration in the first timing task based on the base-station system time, to obtain a calibrated current timing duration; and is also configured to execute the timing service instruction based on the service instruction type and the configuration parameter when the current timekeeping duration of the first timing task is equal to the calibrated current timing duration.

Alternatively, a synchronous network is established between the server, the plurality of base stations and the several electronic shelf labels, and the base station topological structure in the synchronous network includes a master base station, a first-level secondary base station directly connected to the master base station, and a $(i+1)^{th}$-level secondary base station directly connected to an $i^{th}$-level secondary base station; where i is a positive integer greater than or equal to 1, and each base station is connected to only one superior base station.

In a third aspect, an embodiment of the disclosure provides a computer device including a memory, a processor and a computer program stored on the memory and executable on the processor, and when executing the computer program, the processor implements the following steps: an electronic shelf label establishes a first timing task of a timer when receiving a timing service instruction sent in advance by a server through a base station in a synchronous network; and the timing service instruction includes an ID identifier of at least one electronic shelf label, a service instruction type, a configuration parameter and an instruction execution system time; the electronic shelf label determines a timing duration of the first timing task based on time difference between current local system time when the timing service instruction is received and the instruction execution system time, and starts the first timing task; when the electronic shelf label periodically receives a synchronization signal including base-station system time that is sent by the base station, the electronic shelf label cyclically calibrates current local system time when the synchronization signal is received and a current timing duration in the first timing task based on the base-station system time, to obtain a calibrated current timing duration; when the current timekeeping duration of the first timing task is equal to the calibrated current timing duration, the electronic shelf label executes the timing service instruction based on the service instruction type and the configuration parameter.

Those skilled in the art may understand that all or part of the procedures in the methods of the above embodiments may be implemented by instructing related hardware via a computer program, and the program may be stored in a non-volatile computer-readable storage medium. When being executed, the program may include procedures in the methods of the above embodiments. In this embodiment, any reference to a memory, a storage, a database or other media used in the embodiments of the present disclosure may include a non-volatile and/or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random-access memory (RAM) or an external cache memory. By way of illustration rather than limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM(RDRAM), a direct Rambus dynamic RAM (DRDRAM), a Rambus dynamic RAM (RDRAM), etc.

It should be noted that herein relational terms such as "first" and "second" are only used to distinguish one entity or operation from another entity or operation, and do not necessarily require or imply that any such actual relationship or order is existed between the entities or operations. Moreover, the terms "comprise," "include" and any other variation thereof are intended to cover non-exclusive inclusions, so that a process, a method, an article or a device including a series of elements includes not only those elements, but also other elements not explicitly listed or elements inherent to the process, the method, the article or the device. Without further limitations, an element defined by a phrase "comprising a . . . " does not exclude the existence of other identical elements in a process, a method, an article or a device including the element.

What is claimed is:

1. A shelf label communication method based on a synchronous network, comprising:

establishing, by an electronic shelf label, a first timing task of a timer in response to receiving a timing service instruction sent by a server through a base station in a synchronous network, wherein the timing service instruction comprises an ID identifier of at least one electronic shelf label, a service instruction type, a configuration parameter and an instruction execution system time;

determining, by the electronic shelf label, a timing duration of the first timing task based on a time difference between a first current local system time when the timing service instruction is received and the instruction execution system time, and starting, by the electronic shelf label, the first timing task;

cyclically calibrating, by the electronic shelf label and in response to periodically receiving a synchronization signal comprising base-station system time that is sent by the base station, a second current local system time when the synchronization signal is received and a current timing duration of the first timing task based on the base-station system time, to obtain a calibrated current timing duration; and executing, by the electronic shelf label, the timing service instruction based on the service instruction type and the configuration parameter in response to determining that the current timekeeping duration of the first timing task is equal to the calibrated current timing duration.

2. The shelf label communication method according to claim 1, wherein the server is configured to:

establish a first synchronization period and a second synchronization period, wherein each second synchronization period comprises N first synchronization periods, and wherein N is a positive integer greater than or equal to 1; and allocate a transceiving time slot in the first synchronization period to each base station based on a base station topological structure in the synchronous network, and send the transceiving time slot to a corresponding base station through a control instruction.

3. The shelf label communication method according to claim 2, wherein the base station topological structure in the synchronous network comprises a master base station, a first-level secondary base station directly connected to the master base station, and a $(i+1)^{th}$-level secondary base station directly connected to an $i^{th}$-level secondary base station, wherein i is a positive integer greater than or equal to 1, and each base station is connected to only one superior base station.

4. The shelf label communication method according to claim 3, wherein at a first establishment of the synchronous network:
the server is configured to send a synchronization signal comprising initial system time of the server to the master base station in the synchronous network, so that the master base station starts to operate according to the initial system time of the server;
the master base station is configured to send a synchronization signal comprising system time of the master base station in a transmission time slot of the first synchronization period, so that the electronic shelf label and the first-level secondary base station communicate with the master base station start to operate according to the system time of the master base station; and
the $i^{th}$-level secondary base station is configured to send a synchronization signal comprising local system time of the $i^{th}$-level secondary base station in the transmission time slot of the first synchronization period, so that the electronic shelf label and the $(i+1)^{th}$-level secondary base station that communicate with the $i^{th}$-level secondary base station respectively start to operate according to the local system time of the $i^{th}$-level secondary base station.

5. The shelf label communication method according to claim 4, wherein after the $i^{th}$-level secondary base station sends the synchronization signal comprising the local system time of the $i^{th}$-level secondary base station in the transmission time slot of the first synchronization period, the master base station is configured to:
periodically send a system time request to the server to obtain current system time of the server; and
after calibrating local system time of the master base station based on the current system time of the server, send a synchronization signal comprising calibrated local system time of the master base station in a transmission time slot of a 1st first synchronization period in each second synchronization period, so that the electronic shelf label and the first-level secondary base station that communicate with the master base station calibrate local system time of the electronic shelf label and local system time of the first-level secondary base station respectively based on the calibrated local system time of the master base station; and
wherein the $i^{th}$-level secondary base station is configured to send a synchronization signal comprising calibrated local system time of the $i^{th}$-level secondary base station in the transmission time slot of the first synchronization period, so that the electronic shelf label and the $(i+1)^{th}$-level secondary base station that communicate with the $i^{th}$-level secondary base station calibrate the local system time of the electronic shelf label and the local system time of the $(i+1)^{th}$-level secondary base station respectively based on the calibrated local system time of the $i^{th}$-level secondary base station.

6. The shelf label communication method according to claim 5, wherein the master base station is further configured to:
send a synchronization signal not comprising the local system time of the master base station in a transmission time slot of a non-1 st first synchronization period in each second synchronization period.

7. The shelf label communication method according to claim 3, wherein the base-station system time comprises the calibrated local system time of the master base station or the calibrated local system time of the $i^{th}$-level secondary base station.

8. The shelf label communication method according to claim 1, wherein the timing service instruction further comprises service execution duration, and the method further comprises:
establishing, by the electronic shelf label, a second timing task of the timer, and determining, by the electronic shelf label, the service execution duration as a timing duration of the second timing task; and
in response to a current timekeeping duration of the second timing task equal to the service execution duration, executing, by the electronic shelf label, a latest historical service instruction prior to the timing service instruction.

9. The shelf label communication method according to claim 1, further comprising:
in response to receiving at least two timing service instructions sent by the server through the base station in the synchronous network, determining, by the electronic shelf label, whether service instruction types of at least two timing service instructions are the same; and
establishing, by the electronic shelf label, corresponding timing tasks for different timing service instructions, in response to determining that the service instruction types of the at least two timing service instructions are all different, or in response to determining that the instruction types of the at least two timing service instructions are the same and the instruction execution system time does not overlap.

10. The shelf label communication method according to claim 9, further comprising:
in response to determining that the at least two timing service instructions have two target timing service instructions which have the same service type and of which the instruction execution system time also effectively overlap, fusing, by the electronic shelf label, the two target timing service instructions and then establishing, by the electronic shelf label, a corresponding timing task.

11. A shelf label system, comprising:
a server, configured to send a timing service instruction prior to an instruction execution system time, wherein the timing service instruction includes an ID identifier of at least one electronic shelf label, a service instruction type, a configuration parameter and the instruction execution system time;
a plurality of base stations, wherein a base station is configured to:
send the received timing service instruction to an electronic shelf label,
receive the synchronization signal with the base-station system time sent by a superior base station to calibrate the local system time, and periodically send calibrated local system time as base-station system time of a current base station to at least one of a subordinate secondary base station or an electronic shelf label; and a plurality of electronic shelf labels, wherein an electronic shelf label is configured to:

establish a first timing task of a timer in response to receiving the timing service instruction, determine a timing duration of the first timing task based on a time difference between a first current local system time when the timing service instruction is received and the instruction execution system time, and to start the first timing task, and cyclically calibrate a second current local system time when the synchronization signal is received and a current timing duration in the first timing task based on the base-station system time, to obtain a calibrated current timing duration, and execute the timing service instruction based on the service instruction type and the configuration parameter in response to determining that a current timekeeping duration of the first timing task is equal to the calibrated current timing duration.

12. The shelf label system according to claim 11, wherein a synchronous network is established between the server, the plurality of base stations and the plurality of electronic shelf labels, wherein a base station topological structure in the synchronous network comprises a master base station, a first-level secondary base station directly connected to the master base station, and a $(i+1)^{th}$-level secondary base station directly connected to an $i^{th}$-level secondary base station, where i is a positive integer greater than or equal to 1, and each base station is connected to only one superior base station.

13. The shelf label system according to claim 11, wherein the server is configured to:

establish a first synchronization period and a second synchronization period, wherein each second synchronization period comprises N first synchronization periods, and wherein N is a positive integer greater than or equal to 1; and allocate a transceiving time slot in the first synchronization period to each base station based on a base station topological structure in the synchronous network, and send the transceiving time slot to a corresponding base station through a control instruction.

14. The shelf label system according to claim 12, wherein at a first establishment of the synchronous network:

the server is configured to send a synchronization signal comprising initial system time of the server to the master base station in the synchronous network, so that the master base station starts to operate according to the initial system time of the server;

the master base station is configured to send a synchronization signal comprising system time of the master base station in a transmission time slot of the first synchronization period, so that the electronic shelf label and the first-level secondary base station communicate with the master base station start to operate according to the system time of the master base station; and the $i^{th}$-level secondary base station is configured to send a synchronization signal comprising local system time of the $i^{th}$-level secondary base station in the transmission time slot of the first synchronization period, so that the electronic shelf label and the $(i+1)^{th}$-level secondary base station that communicate with the $i^{th}$-level secondary base station respectively start to operate according to the local system time of the $i^{th}$-level secondary base station.

15. The shelf label system according to claim 14, wherein after the $i^{th}$-level secondary base station sends the synchronization signal comprising the local system time of the $i^{th}$-level secondary base station in the transmission time slot of the first synchronization period, the master base station is configured to:

periodically send a system time request to the server to obtain current system time of the server; and after calibrating local system time of the master base station based on the current system time of the server, send a synchronization signal comprising the calibrated local system time of the master base station in a transmission time slot of a 1st first synchronization period in each second synchronization period, so that the electronic shelf label and the first-level secondary base station that communicate with the master base station calibrate local system time of the electronic shelf label and local system time of the first-level secondary base station respectively based on the calibrated local system time of the master base station; and wherein the $i^{th}$-level secondary base station is configured to send, a synchronization signal comprising the calibrated local system time of the $i^{th}$-level secondary base station in the transmission time slot of the first synchronization period, so that the electronic shelf label and the $(i+1)^{th}$-level secondary base station that communicate with the $i^{th}$-level secondary base station calibrate the local system time of the electronic shelf label and the local system time of the $(i+1)^{th}$-level secondary base station respectively based on the calibrated local system time of the $i^{th}$-level secondary base station.

16. The shelf label system according to claim 15, wherein the master base station is further configured to:

send a synchronization signal not comprising the local system time of the master base station in a transmission time slot of a non-1 st first synchronization period in each second synchronization period.

17. The shelf label system according to claim 15, wherein the base-station system time comprises the calibrated local system time of the master base station or the calibrated local system time of the $i^{th}$-level secondary base station.

18. The shelf label system according to claim 11, wherein the timing service instruction further comprises service execution duration, and the electronic shelf label is further configured to:

establish a second timing task of the timer, and determine the service execution duration as a timing duration of the second timing task; and in response to a current timekeeping duration of the second timing task equal to the service execution duration, execute a latest historical service instruction prior to the timing service instruction.

19. The shelf label system according to claim 11, wherein the electronic shelf label is further configured to:

in response to receiving at least two timing service instructions sent by the server through the base station in the synchronous network, determine whether service instruction types of at least two timing service instructions are the same; and establish corresponding timing tasks for different timing service instructions, in response to determining that the service instruction types of the at least two timing service instructions are all different, or in response to determining that the instruction types of the at least two timing service instructions are the same and the instruction execution system time does not overlap.

20. A computer device, comprising:
a memory,
a processor, and
a computer program stored in the memory and executable on the processor, wherein when executing the computer program, the processor is caused to implement acts comprising:
  establishing a first timing task of a timer in response to receiving a timing service instruction sent by a server through a base station in a synchronous network, wherein the timing service instruction comprises an ID identifier of at least one electronic shelf label, a service instruction type, a configuration parameter and an instruction execution system time;
  determining a timing duration of the first timing task based on a time difference between a first current local system time when the timing service instruction is received and the instruction execution system time, and starting, by the electronic shelf label, the first timing task;
  cyclically calibrating, in response to periodically receiving a synchronization signal comprising base-station system time that is sent by the base station, a second current local system time when the synchronization signal is received and a current timing duration of the first timing task based on the base-station system time, to obtain a calibrated current timing duration; and
  executing the timing service instruction based on the service instruction type and the configuration parameter in response to determining that the current timekeeping duration of the first timing task is equal to the calibrated current timing duration.

* * * * *